United States Patent
Strumolo et al.

(10) Patent No.: US 7,161,472 B2
(45) Date of Patent: Jan. 9, 2007

(54) BLIND-SPOT WARNING SYSTEM FOR AN AUTOMOTIVE VEHICLE

(75) Inventors: Gary S. Strumolo, Beverly Hills, MI (US); Hanaan Elmessiri, Inkster, MI (US); David M. DiMeo, Windsor, CA (US); Ronald H. Miller, Saline, MI (US); Aric David Shaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 10/709,916

(22) Filed: Jun. 4, 2004

(65) Prior Publication Data

US 2004/0246113 A1 Dec. 9, 2004

Related U.S. Application Data

(60) Provisional application No. 60/476,521, filed on Jun. 6, 2003.

(51) Int. Cl.
  *B60Q 1/00* (2006.01)
  *B08B 1/16* (2006.01)
(52) U.S. Cl. .................. 340/436; 340/435; 340/903; 340/941; 340/961; 180/167; 701/301
(58) Field of Classification Search ............. 340/903, 340/435
See application file for complete search history.

(56) References Cited

U.S. PATENT DOCUMENTS

| | | | |
|---|---|---|---|
| 4,802,096 A * | 1/1989 | Hainsworth et al. | 701/301 |
| 5,134,371 A * | 7/1992 | Watanabe et al. | 324/252 |
| 5,471,214 A * | 11/1995 | Faibish et al. | 342/70 |
| 5,767,766 A * | 6/1998 | Kwun | 340/436 |
| 6,094,610 A * | 7/2000 | Steffens et al. | 701/45 |
| 6,437,561 B1 * | 8/2002 | Bartingale et al. | 324/207.22 |
| 6,714,127 B1 * | 3/2004 | Perez et al. | 340/467 |
| 6,784,792 B1 * | 8/2004 | Mattes et al. | 340/436 |
| 2004/0056652 A1 * | 3/2004 | Bomya | 324/207.17 |
| 2004/0233048 A1 * | 11/2004 | Luna et al. | 340/435 |

* cited by examiner

*Primary Examiner*—Donnie L. Crosland
(74) *Attorney, Agent, or Firm*—Frank A. MacKenzie; Artz & Artz, P.C.

(57) ABSTRACT

A host vehicle system includes a blind-spot warning system providing an indication to the host vehicle a target vehicle entering a blind-spot. The system includes a vehicle bus receiving various vehicle control signals, magneto-resistive sensors receiving proximity information as a function of magnetic field variations, a smart algorithm controller analyzing bus signals and sensor signals, and various vehicle collision systems such as passive restraints, optical light guides, and audible warnings operating in response to a threat from a target vehicle.

16 Claims, 3 Drawing Sheets

BLIND-SPOT WARNING SYSTEM FOR AN AUTOMOTIVE VEHICLE

CROSS REFERENCE TO RELATED APPLICATIONS

The present invention claims priority to provisional application No. 60/476,521 filed on Jun. 6, 2003.

BACKGROUND OF INVENTION

Collision warning systems are becoming more widely used. In general, collision warning systems provide a vehicle operator knowledge and awareness of objects or vehicles within close proximity so as to prevent a collision with those objects. Current collision warning systems are unitary in nature in that they only warn the operator of the vehicle containing the collision warning system of a potential collision. A sensor located on a vehicle, upon sensing an object generates an object detection signal, which is communicated to the operator of that vehicle.

Warning systems for vehicles that are directed to the rear of the vehicle are known. However, high end warning systems require expensive sensors and sensing equipment. Conversely, most inexpensive systems cannot provide the required performance across all ranges of environment conditions and target types. Also, rear-sensing systems tend to monitor the rear of the vehicle without monitoring the transition of a vehicle from the rear of the vehicle to the blind-spot.

Therefore, it would be desirable to provide an improved blind-spot warning system. The improved system may increase reaction time and decrease the probability of a collision occurring while reducing costs associated with the system.

SUMMARY OF INVENTION

In one aspect of the invention, a host vehicle system includes a blind-spot warning system providing an indication to the host vehicle of a target vehicle entering a blind-spot. The system includes a vehicle bus receiving various vehicle control signals, magneto-resistive sensors receiving proximity information as a function of magnetic field variations, a smart algorithm controller analyzing bus signals and sensor signals, and various vehicle collision systems such as passive restraints, optical light guides, and audible warnings operating in response to a threat from a target vehicle.

In a further aspect of the invention, a method for operating a blind-spot detection system for a host vehicle includes sensing magnetic field changes caused by a target object in or near a vehicle blind-spot. A magnetic field signature is generated as a function of the magnetic field changes. At least one algorithm is processed as a function of the magnetic field signature, and a countermeasure is activated in response to signals indicating a target vehicle in or near the vehicle blind-spot as a function of the processing of the algorithm.

Accordingly, an advantage of the present invention is to provide an improved blind-spot warning system for use in an automotive vehicle.

Advantages over optical and hall sensor techniques are numerous in that these sensors are inexpensive, are well suited for variable temperatures and rugged environments, and offer excellent response and significantly less need for readjustment when the system is jostled or vibrating.

Another advantage of the present invention is that it increases the reaction time for both operators of the target vehicle and the approaching vehicle. Thereby, decreasing the probability of a collision between the two vehicles.

Other advantages and features of the present invention will become apparent when viewed in light of the detailed description of the preferred embodiment when taken in conjunction with the attached drawings and appended claims.

DETAILED DESCRIPTION

Figure 1:
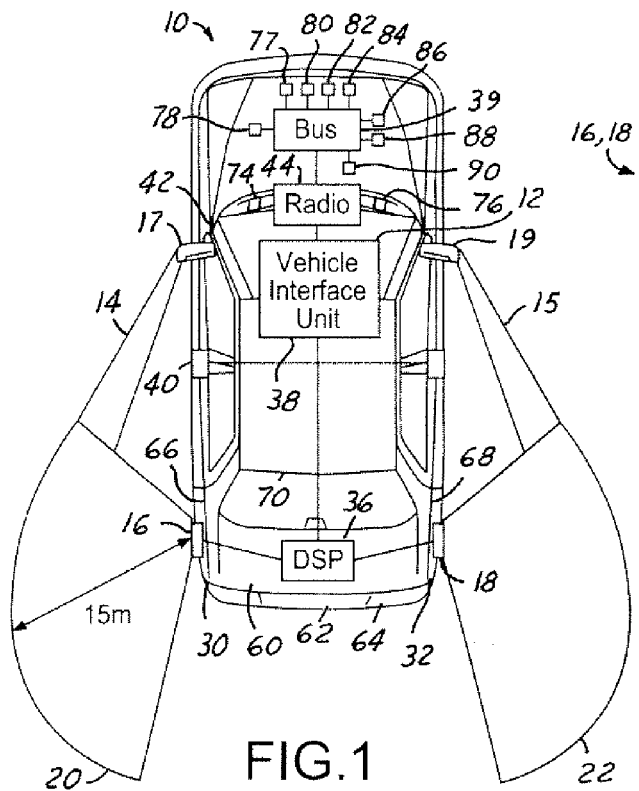
FIG. 1 is a top diagrammatic view of a host vehicle in accordance with one embodiment of the present invention.

In the following figures the same reference numerals will be used to illustrate the same components. While the present invention is described with respect to a particular method and apparatus for blind-spot warning, various adaptations will be evident to those skilled in the art.

Figure 2:
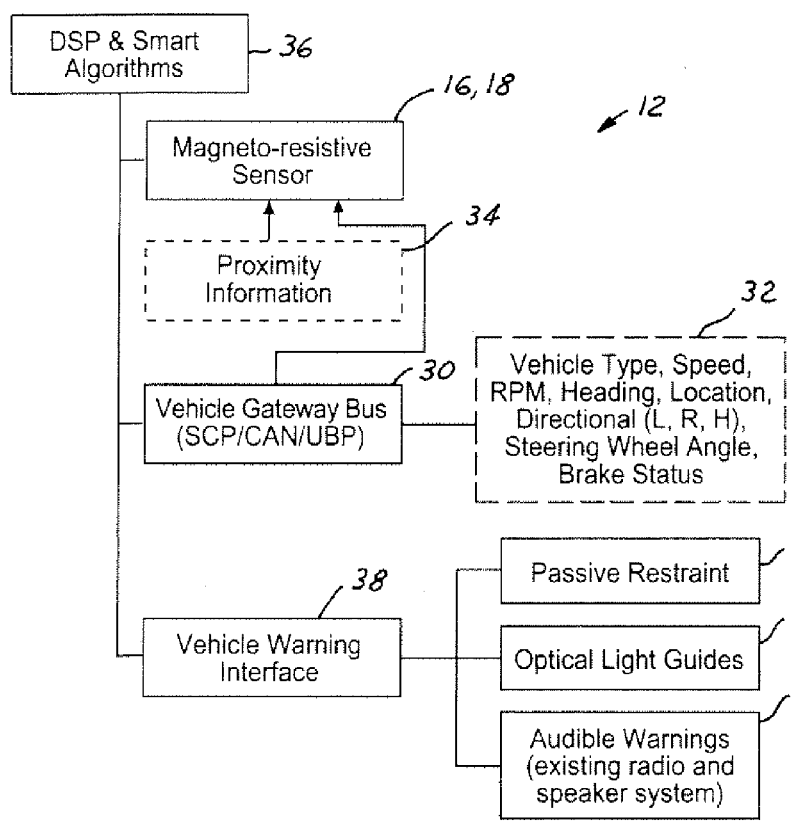
FIG. 2 is a system diagram of the host vehicle of FIG. 1.

Referring now to FIGS. 1 and 2, a host vehicle system 10 having a blind-spot warning system 12, in accordance with one embodiment of the present invention, is illustrated. Representations of blind-spots 14, 15 are illustrated. The blind-spots 14, 15 are the areas beyond which the external rear-view mirrors 17, 19 cannot see without requiring the driver to glance back. The blind-spots 14, 15 may be of many shapes and sizes depending on various factors such as mirror size and vehicle configuration.

The blind-spot warning system 12 provides an indication to the host vehicle driver as to the entering of a target vehicle within at least one of the blind-spots 14, 15. The system 12 includes a vehicle bus 39 receiving various vehicle control signals 32, magneto-resistive sensors 16, 18 receiving proximity information 34, a smart algorithm controller 36 (digital signal processor and smart algorithms), a vehicle warning interface 38, and various vehicle collision systems such as passive restraints 40, optical light guides 42, and audible warnings 44. All of these devices will be discussed later.

The host vehicle 10 includes two magneto-resistive sensors 16, 18 having respective fields of view 20, 22. The fields of view 20, 22 may not overlap or may slightly overlap blind-spots 14, 15. Therefore, the present invention also monitors the transition from the sensor fields of view 20, 22 to the blind-spots 14, 15. Sensors 16, 18 are preferably magneto-resistive sensors.

Today's technology allows small sensors to be placed inconspicuously on rear panels 30, 32 of the vehicle so as not to become aesthetically displeasing. Various locations near the rear of the vehicle 10 including the trunk lid 60, the tailgate 62, the bumper 64, an area above the tires 66, 68, an area within vehicle side panels 30, 32, or a rear portion of the roof 70 may all be desirable locations for the sensors 16, 18.

The sensors 16, 18, sense target objects or vehicles. A target vehicle is any vehicle proceeding from directly behind host vehicle 10 to approaching the host vehicle 10 on the passenger side and eventually entering into one of the blind-spots 14, 15.

Referring now to FIG. 2, a block diagram of the blind-spot warning system 12 or Next Generation Blind-spot Detection System (NG-BDS) is illustrated. As was mentioned, the system 12 includes the magneto-resistive sensors 16, 18 receiving proximity information 34; the vehicle bus 39 receiving various vehicle control signals 32; the smart algorithm controller 36 processing signals from the vehicle bus 39 and the magneto-resistive sensors 16, 18: the vehicle warning interface 38 responding to controller signals; and various vehicle collision systems activated in response to signals from the vehicle warning interface 38.

Figure 3A:
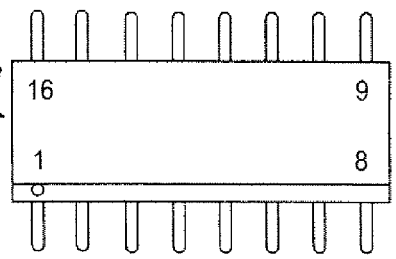
FIG. 3A is a top view of a magneto-resistive sensor in accordance with another embodiment of the present invention.
Figure 3B:
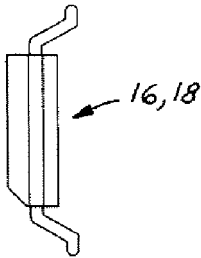
FIG. 3B is a side view of FIG. 3A.

The magneto-resistive sensors 16, 18, which are illustrated in FIGS. 3A and 3B, receive proximity information 34 from areas 20, 22. A top view of a sensor 16 or 18 is illustrated in FIG. 3A, and a side view of the sensor 16 or 18 is illustrated in FIG. 3B. Both sensors 16, 18 are embodied as passive such that no power is required in order to activate the system 12, however, signals received from the sensors 16, 18 are in the form of changes in current as a function of magnetic field changes. The magneto-resistive sensors 16, 18 make use of magnetic field changes that occur when metallic compounds, such as target vehicles, pass within close proximity of their respective permanent magnets. The field changes are received in the controller 36 to determine the properties of the target vehicle's motion. These small sensors 16, 18 are effective in observing linear as well as circular motion.

The magneto-resistive sensors 16, 18 are mounted in the rear quarter panels 30, 32 of the vehicle 10 as displayed in FIG. 1. The sensors 16, 18 can determine the magnitude and direction of magnetic field variation within a range of, for example, 15 meters. These sensors 16, 18 have sufficient sensitivity to measure variations in the Earth's magnetic field to, for example, 1 part in 12000. Once a sufficient magnetic field variation is observed and is correlated to the vehicle's dynamics in the controller 36, a suitable countermeasure is determined and implemented.

The first magneto-resistive sensor 16 senses a first magnetic field variation in a first sensor area 20, and the second magneto-resistive sensor 18 senses a second magnetic field variation in a second sensor area 22. In other words, in response to target vehicles entering one or both of the sensor areas 20, 22, signals are generated through the respective sensors 16, 18 as a function of magnetic field variation.

Figure 5:
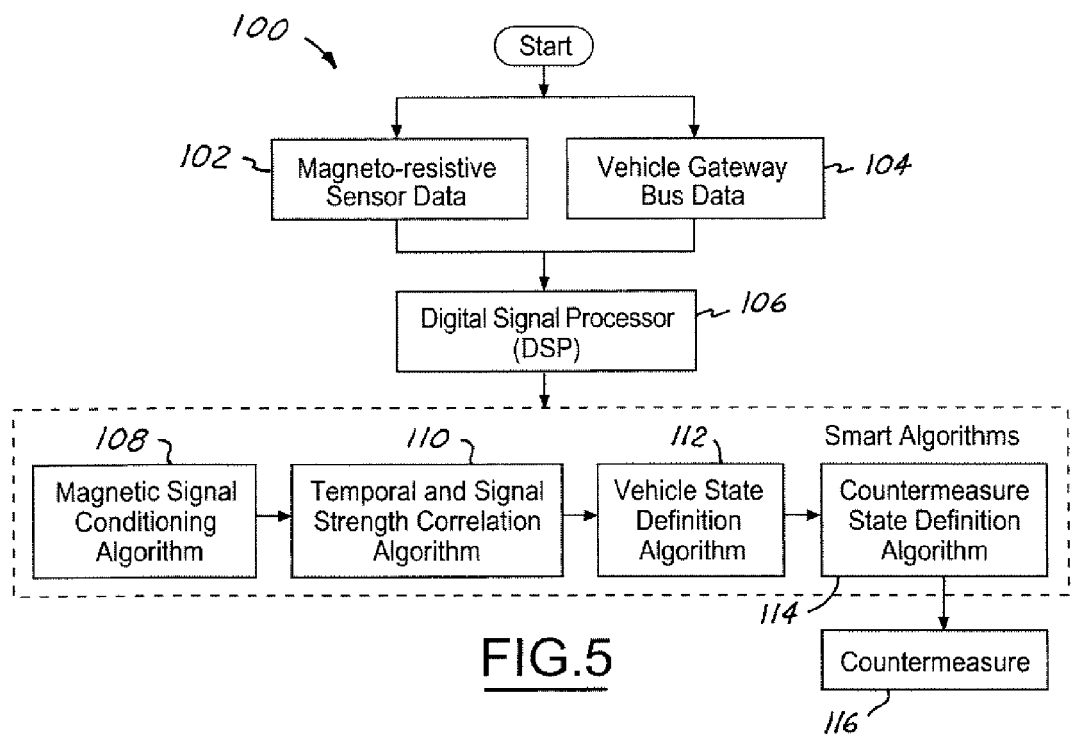
FIG. 5 is a flow chart of the operation of the blind-spot warning system.

The smart algorithm controller 36 or Digital Signal Processor (DSP), including logic further illustrated in FIG. 5. Implements advanced algorithms for processing signals from the vehicle bus 39 and the magneto-resistive sensors 16, 18. These advanced algorithms, also referred to as smart algorithms. Include, for example, a magnetic signal conditioning algorithm including filtering and smoothing algorithms, a temporal and signal strength correlation algorithm, a vehicle state definition algorithm, and a countermeasure state definition algorithm.

The controller 36 is preferably a microprocessor-based controller having a central processing unit, internal memory such as RAM or ROM, and associated inputs and outputs communicating across the 39 bus. The controller 36 may be a portion of a central vehicle main control unit or stand-alone unit. The controller 36 may include various processing units which may be incorporated as separate devices or as an integral part of the controller.

The controller 36 receives information from the magneto-resistive sensor (MRS) and vehicle status data from the vehicle gateway bus. In real-time, the advanced algorithms determine the likelihood of a threat on the roadway. Once the severity of a threat has been determined, the controller 36 communicates through the vehicle interface unit 38 that can result in optical, audible, or voice warnings, including the use of a passive restraint system 40.

The vehicle interface unit 38 or vehicle warning interface receives signals from the controller 36 and activates vehicle systems including, for example, optical warnings from dashboard lights 74 or light guides 42 or a light emitting diode (LED), audible warnings from the radio 44 or a speaker, visual warnings from a heads-up display, or voice warnings from a pre-crash warning system 76. The embodied interface unit 38 also activates the passive restraint system 40 when a threat in the blind-spot is determined by the controller 36.

The vehicle bus 39 receives various vehicle control signals 32 and generates therefrom vehicle status data. Sensors and control units generating vehicle control signals include, for example, a vehicle type information unit 77 generating vehicle type information, vehicle speed sensors 78 generating vehicle speed signals, an RPM (revolutions per minute) reader 80 generating RPM signals, a heading indicator 82 generating a heading of host vehicle signal, a location indicator 84 such as a GPS system generating a location of vehicle signal, a directional signal generator 86 generating a host vehicle directional signal (e.g. left, right, heading), a steering wheel angle sensor 88 generating a steering wheel angle signal, and a brake status sensor 90 generating a brake status signal. One skilled in the art will realize that the vehicle bus 39 may also receive various other sensor and control signals.

Figure 4A:
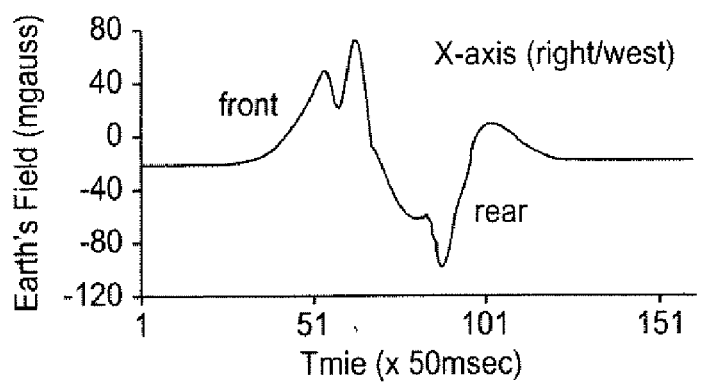
FIG. 4A is a graph of magneto-resistive sensor properties of a sensor in a westward direction, perpendicular to a direction of travel of a target vehicle.
Figure 4B:
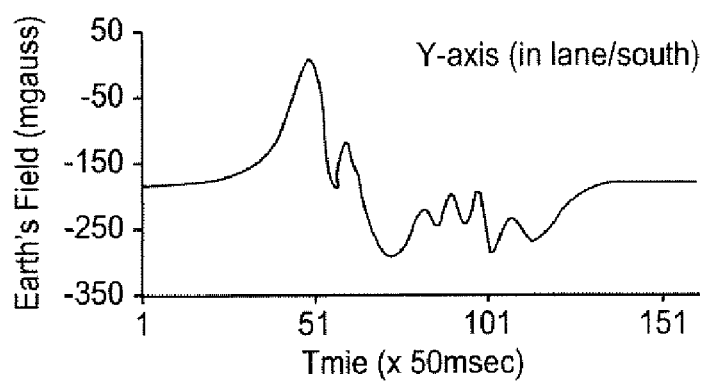
FIG. 4B is a graph of magneto-resistive sensor properties of the sensor of FIG. 4A in a southward direction, opposing a direction of travel of the target vehicle.
Figure 4C:
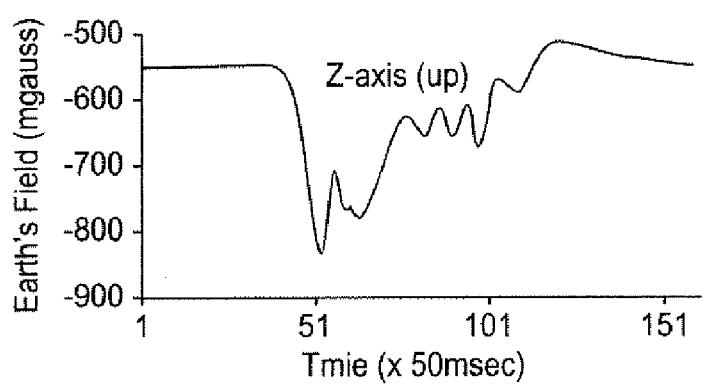
FIG. 4C is a graph of magneto-resistive sensor properties of the sensor of FIG. 4A in an upwards direction, perpendicular to the earth over which the target vehicle is passing.
Figure 4D:
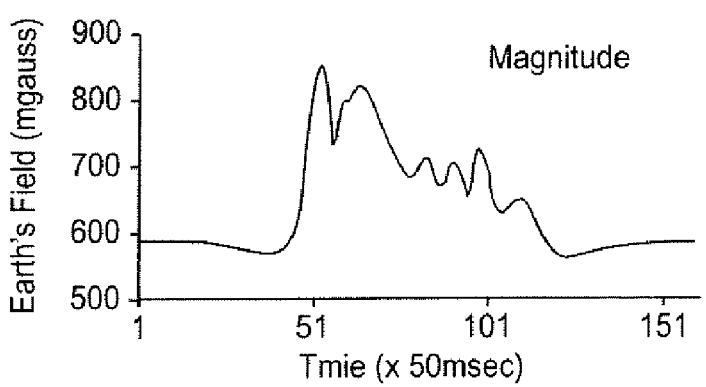
FIG. 4D is a graph of magneto-resistive sensor properties of the sensor of FIG. 4A wherein a magnitude of the target vehicle is illustrated.

Referring now to FIGS. 4A–4D, experimental results of magneto-resistive sensors sensing a target vehicle passing a host vehicle are illustrated. As illustrated, the magneto-resistive sensors 16, 18 can easily determine the presence of the target vehicle in a host vehicle blind-spot and detect the relative motion of the vehicles, which may be used in threat detection algorithms. FIG. 4A is a graph of magneto-resistive sensor properties of a sensor in a westward direction, perpendicular to a direction of travel of a passing vehicle. FIG. 4B is a graph of magneto-resistive sensor properties of the sensor of FIG. 4A in a southward direction, opposing a direction of travel of the passing vehicle. FIG. 4C is a graph of magneto-resistive sensor properties of the sensor of FIG. 4A in an upwards direction, perpendicular to the earth over which the vehicle is passing. FIG. 4D is a graph of magnetoresistive sensor properties of the sensor of FIG. 4A wherein a magnitude of the passing vehicle is illustrated.

Referring to FIG. 5, a flow chart 100 of the operation of the blind-spot warning system, in accordance with another embodiment of the present invention, is illustrated. Logic starts in operation block 102 when a target vehicle or object is sensed by the sensor 16 or 18.

In operation block 104, the vehicle gateway bus 39 receives vehicle control signals 32 and generates therefrom vehicle bus signals.

In operation block 106, the controller 36 or digital signal processor receives the change of current or magnetic field signature from the sensor 16 or 18 and the vehicle bus signals and activates various algorithms to process the signals.

In operation block 108, a magnetic signal conditioning algorithm is activated; and the magnetic field signature is filtered and smoothed.

In operation block 110, a temporal and signal strength correlation algorithm is activated; and the magnetic field signature is analyzed to determine the proximity and size of the target vehicle.

In operation block 112, a vehicle state definition algorithm is activated; and the state of the host vehicle in relation to the target vehicle is determined.

In operation block 114, a countermeasure state definition algorithm is activated; and a determination is made whether a countermeasure is required and also which countermeasure may be required.

In operation block 116, countermeasures are activated in response to signals from operation block 114 indicating a target vehicle in or near a blind-spot 14 or 15 of the host vehicle 10.

This technology is relatively low cost and holds the potential to be implemented with high operating performance.

In operation, a method for operating a blind-spot detection system for a host vehicle includes sensing magnetic field changes caused by a target object in or near a vehicle blind-spot; and generating a magnetic field signature as a function of the magnetic field changes. The method also includes receiving a vehicle control signal from a vehicle system and generating a vehicle bus signal from the vehicle control signal.

The method still further includes processing an algorithm as a function of the vehicle bus signal and the magnetic field signature. This processing may include determining required countermeasures necessary to reduce a likelihood of an accident, processing a magnetic signal conditioning algorithm for filtering and smoothing the magnetic field signature, processing a temporal and signal strength correlation algorithm for analyzing the magnetic field signature for determining a proximity and size of the target object, processing a vehicle state definition algorithm whereby a state of the host vehicle in relation to the target object is determined, or processing a countermeasure state definition algorithm for determining whether a countermeasure is required and which countermeasure may be required.

In response to signals generated during the processing steps, a countermeasure is activated in response to signals indicating a target vehicle in or near the vehicle blind-spot.

While particular embodiments of the invention have been shown and described, numerous variations and alternate embodiments will occur to those skilled in the art. Accordingly, it is intended that the invention be limited only in terms of the appended claims.

The invention claimed is:

1. A warning system for a host vehicle comprising:
   a first magneto-resistive sensor coupled to the host vehicle, said first magneto-resistive sensor sensing a first magnetic field variation in a first sensor area external to the host vehicle and generating a first sensor signal therefrom; and
   a controller coupled to the host vehicle receiving said first sensor signal, said controller generating a signal for activating a vehicle system in response to said first sensor signal; and
   a vehicle bus receiving various vehicle control signals and generating therefrom a vehicle bus signal, wherein said controller generates said signal for activating said vehicle system as a function of said vehicle bus signal;
   wherein said vehicle bus receives at least one of a vehicle type information signal, a vehicle speed signal, an RPM signal, a heading of host vehicle signal, a location of vehicle signal, a host vehicle directional signal, a steering wheel angle signal, or a brake status signal and generates said vehicle bus signal as a function of said at least one of said signals.

2. The system of claim 1 further comprising a vehicle warning interface receiving said signal for activating said vehicle system from said controller, said vehicle warning interface activating said vehicle system in response to said signal for activating said vehicle system.

3. The system of claim 2, wherein said vehicle system comprises at least one of a dashboard light, a light guide, an LED, a radio, a speaker, a pre-crash warning system, a heads-up display, or a passive restraint system.

4. The system of claim 1 further comprising a second magneto-resistive sensor sensing a second magnetic field variation in a second sensor area external to the host vehicle and generating a second sensor signal therefrom.

5. A system as recited in claim 1, wherein said sensor is coupled to at least one of an area near a rear of the vehicle, a trunk lid, a tailgate, a bumper, an area above tires of the vehicle, an area within vehicle side panels, or a rear portion of a roof of the vehicle.

6. The system of claim 1, wherein said controller further comprises at least one of a signal conditioning algorithm, a temporal and signal strength correlation algorithm, a vehicle state definition algorithm, or a countermeasure state definition algorithm for generating said signal for activating said vehicle system.

7. The system of claim 6, wherein said temporal and signal strength correlations algorithms are used in conjunction with a threshold comparison to assess a probability of an accident.

8. The system of claim 1, wherein said first sensor area coincides with at least a portion of a blind-spot of the host vehicle.

9. A blind-spot detection system for a host vehicle comprising:
   a first magneto-resistive sensor coupled to a first rear area of the host vehicle, said first magneto-resistive sensor sensing a first magnetic field variation in a first sensor area coinciding at least partially with a first blind-spot of the host vehicle, said first magneto-resistive sensor generating a first sensor signal therefrom;
   a second magneto-resistive sensor coupled to a second rear area of the host vehicle, said second magneto-resistive sensor sensing a second magnetic field variation in a second sensor area coinciding at least partially with a second blind-spot of the host vehicle, said second magneto-resistive sensor generating a second sensor signal therefrom;
   a vehicle bus receiving various vehicle control signals and generating therefrom a vehicle bus signal;
   a vehicle warning interface receiving a signal for activating said vehicle system, said vehicle warning interface activating said vehicle system in response to said signal for activating said vehicle system; and
   a controller coupled to the host vehicle receiving said first sensor signal, said second sensor signal, and said vehicle bus signal, said controller generating said signal for activating a vehicle system in response to said vehicle bus signal and at least one of said first sensor signal or said second sensor signal.

10. The system of claim 9, wherein said vehicle system comprises at least one of a dashboard light, a light guide, an LED, a radio, a speaker, a pre-crash warning system, or a passive restraint system.

11. A method for operating a blind-spot detection system for a host vehicle comprising:

sensing magnetic field changes caused by a target object in or near a vehicle blind-spot;

generating a magnetic field signature as a function of said magnetic field changes;

receiving a vehicle control signal;

generating a vehicle bus signal from said vehicle control signal;

processing at least one algorithm as a function of said magnetic field signature and said vehicle bus signal;

activating a countermeasure in response to signals indicating a target vehicle in or near said vehicle blind-spot as a function of said processing of said at least one algorithm, wherein said vehicle control signal is at least one of a vehicle type information signal, a vehicle speed signal, an RPM signal, a heading of host vehicle signal, a location of vehicle signal, a host vehicle directional signal, a steering wheel angle signal, or a brake status signal and generates said vehicle bus signal as a function of said at least one of said signals.

12. The method of claim 11, wherein processing further comprises determining required countermeasures necessary to reduce a likelihood of an accident.

13. The method of claim 11, wherein processing further comprises processing a magnetic signal conditioning algorithm for filtering and smoothing said magnetic field signature.

14. The method of claim 11, wherein processing further comprises processing a temporal and signal strength correlation algorithm for analyzing said magnetic field signature for determining a proximity and size of said target object.

15. The method of claim 11, wherein processing further comprises processing a vehicle state definition algorithm whereby a state of the host vehicle in relation to said target object is determined.

16. The method of claim 11, wherein processing further comprises processing a countermeasure state definition algorithm for determining whether a countermeasure is required and which countermeasure may be required.

* * * * *